United States Patent [19]
Leslie et al.

[11] 4,145,466
[45] Mar. 20, 1979

[54] MELT STRENGTH IMPROVEMENT OF PET

[75] Inventors: John P. Leslie, Levittown; Constance A. Lane, Philadelphia; R. Peter Grant, Newtown, all of Pa.

[73] Assignee: Rohm and Haas Company, Philadelphia, Pa.

[21] Appl. No.: 830,240

[22] Filed: Sep. 2, 1977

[51] Int. Cl.² .............................................. B29C 17/07
[52] U.S. Cl. ....................................... 428/35; 528/273; 264/523; 264/564; 264/211; 428/480
[58] Field of Search ...................... 264/95, 98, 97, 331, 264/211; 260/75 T; 428/35, 480; 215/1 C

[56] References Cited

U.S. PATENT DOCUMENTS

| | | | |
|---|---|---|---|
| 3,553,157 | 1/1971 | Dijkstra et al. | 260/40 R |
| 3,660,557 | 5/1972 | Smith et al. | 264/211 |
| 3,733,309 | 5/1973 | Wyeth et al. | 264/98 |
| 3,803,275 | 4/1974 | Corsover | 264/98 |
| 3,814,786 | 6/1974 | Gall et al. | 264/98 |
| 3,822,332 | 7/1974 | Hrach et al. | 260/75 T |

Primary Examiner—Jeffery R. Thurlow
Attorney, Agent, or Firm—Michael B. Fein

[57] ABSTRACT

Composition and method for improving the thermoplastic processing characteristics of poly(ethylene terephthalate) (PET) in amphorous form are disclosed, as well as PET with improved melt strength.

9 Claims, No Drawings

MELT STRENGTH IMPROVEMENT OF PET

BACKGROUND OF THE INVENTION

I. Field of the Invention

This invention relates to compositions and processes for thermoplastic processing of PET, more particularly extrusion/melt shaping of PET.

II. Description of the Prior Art

Until now, linear thermoplastic polyesters such as PET have found no utility in extrusion/melt shaping and related thermoplastic fabrication techniques that require dimensional stability in the melt because such techniques require high melt viscosity and a high degree of melt strength and elasticity. PET generally has an intrinsic viscosity of about 0.5 to 1.1 dl. per gm. and insufficient melt strength and elasticity for such applications. Furthermore, PET exhibits a fast rate of crystallization at temperatures above 140° C. which makes the achievement of clear amorphous articles by such thermoplastic fabrication techniques difficult. Therefore, until now, articles produced from PET had to be made by injection blow-molding techniques in which a parison or perform is injection molded, cooled rapidly and then reheated to a temperature above the $T_g$ but below the crystalline melting point and then blown to the desired shape. See U.S. Pat. Nos. 3,733,309; 3,745,150; and 3,803,275. While amorphous articles would be preferred because of their clarity and toughness as compared to crystalline articles, until now such processing required very specialized equipment such as is shown in U.S. Pat. No. 3,803,275 wherein a hollow slug was extruded directly into a mold maintained at less than 0° C.

It has been previously suggested by Dijkstra et al, U.S. Pat. No. 3,553,157, to prepare thick-walled shaped articles of improved impact strength from PET and a compound capable of reacting with hydroxyl or carboxyl end groups, for example polyanhydrides. "Thick-walled" is defined by Dijkstra et al as "shape and/or dimensions are such that they are not readily conducive to orientation of the polymer by drawing." Dijkstra et al prefer crystalline articles reinforced by glass fibers, and teach nothing with regard to methods of producing blow-molded articles, blown film or foam from PET, nor anything regarding enhancement of melt characteristics of PET.

Extrusion/melt shaping of poly(butylene terephthalate) (PBT) at intrinsic viscosities at least 1.05 dl./gm. has been accomplished by a variety of techniques. See U.S. Pat. Nos. 3,814,786 and 3,931,114. Borman et al, Ser. No. 382,512 of July 25, 1973 (Netherlands 74,07268) attempt to solve this melt strength problem by the use of branched polyesters. The branching necessarily must be conducted in the polyester kettle and thus there is an upper limit as to how much viscosity Borman et al can achieve while still being able to handle the branched polyester.

The object of the present invention is to provide a method of thermoplastic processing of PET to form amorphous articles. It is a further object to provide amorphous extrusion/melt shaped PET articles. A still further object is to provide clear PET bottles by extrusion blow-molding.

SUMMARY OF THE INVENTION

These and other objects as will become apparent from the following disclosure are achieved by the present invention which comprises in one aspect a composition for improving the thermoplastic processing characteristics of PET comprising (A) a polyanhydride selected from the group consisting of pyromellitic dianhydride, mellitic trianhydride, tetrahydrofuran dianhydride, and polyanhydrides containing at least two unsubstituted or substituted phthalic anhydride radicals; and (B) a fatty acid or N-substituted fatty acid amide having at least 10 carbon atoms in the acid portion of the molecule. In another aspect the invention comprises a composition for thermoplastic processing to form amorphous articles comprising PET, the polyanhydride, and the fatty acid or N-substituted fatty acid amide. In another aspect, the invention comprises a process for preparing noncrystalline shaped articles comprising adding about 0.1 to 5% by weight of a polyanhydride, selected from a defined group, to PET before processing. A still further aspect of the invention comprises films, pipes, foams, containers, profiles, or other articles prepared in accordance with the above-mentioned process.

DETAILED DESCRIPTION OF THE INVENTION

The PET used with this invention contains terminal hydroxyl groups and possesses relatively low melt strength and elasticity before modification. The PET generally has an intrinsic viscosity of about 0.5 to about 1.1 dl/g, preferably about 0.6 to 0.8 dl/g.

The polyanhydride used is selected from the group consisting of pyromellitic dianhydride, mellitic trianhydride, tetrahydrofuran dianhydride, and polyanhydrides containing at least two unsubstituted or substituted phthalic anhydride radicals such as the reaction product from two moles of pyromellitic dianhydride or trimellitic anhydride with one mole of a glycol or other active hydrogen-containing compound.

It has been found that certain types of polyanhydrides do not function in this invention. These include maleic anhydride copolymers, cyclopentane tetracarboxylic acid dianhydride, 1,4,5,8-naphthalene tetracarboxylic acid dianhydride, 3,4,9,10-perylenetetracarboxylic acid dianhydride, and bicyclo (2:2:2) oct-7-ene-2,3,5,6-tetracarboxylic acid dianhydride.

Optimum results are achieved by use of 0.1 to 5% by weight of the polyanhydride, preferably 0.2 to 1.5 percent and most preferably about 0.3 to 1.0 percent by weight based on PET. The most preferred polyanhydride is pyromellitic dianhydride.

The maximum melt viscosity is achieved with stoichiometric equivalence of anhydride groups and terminal hydroxyl groups in the polyester after making allowances for possible side reactions. The higher the processing temperature, the higher the concentration of the modifier composition required for high melt strength at that processing temperature up to the stochiometric equivalence of anhydride and terminal hydroxyl groups.

The optional fatty acid or N-substituted fatty acid amide has at least 10 carbon atoms in the acid portion of the molecule. By the term "fatty acid" is meant to include fatty acids and other materials which generate fatty acids under the processing conditions used. Preferred compounds are palmitic acid, lauric or stearic acid, N-alkyl stearamide, N,N-dialkyl stearamide or alkylene bis(stearamide). Surprisingly other types of lubricants which would be expected to function equivalently in this process have been found to be unsuitable.

The lubricants found to be unsuitable were metal stearates, unsubstituted fatty acid amides, paraffin waxes, ester waxes, polyethylene, and oxidized polyethylenes.

From about 0.1 to 5% by weight of fatty acid or N-substituted fatty acid is suitable, with a preferred amount being about 0.25 to 1.5 percent by weight.

The polyanhydride and the optional fatty acid or N-substituted fatty acid amide are suitably incorporated in the composition by mixing at some time prior to melt blending in the extruder. The melt blending step may be separate and distinct or identical with the processing step to produce the finished article.

It is important that no crystallization promoter is present in the composition since this invention is directed to compositions suitable for producing amorphous, non-crystalline articles. If substantial crystallization occurs in the process the resultant articles become opaque and brittle. In some cases, such as with pipe, foam and profile extrusion, a small degree of crystallinity may be acceptable and can be achieved by control of the cooling cycle. However, in most cases it is preferred to prepare amorphous articles on standard extrusion equipment with no special cooling device. The type of article to be produced, whether it be bottles, films, foams, pipes or profile, will govern the auxiliary equipment to be employed. For instance, to produce bottles, blow-molding equipment is necessary. To produce film, blown film equipment is necessary.

The PET, polyanhydride, and optional fatty acid or N-substituted fatty acid amide are extruded to a molten self-supporting preform which is subsequently shaped into a final form and then allowed to cool to a shaped article.

The shaping step can be accomplished by either injecting a fluid into the molten composition, or by means of a die. In the case where a fluid is used, air or inert gas are the preferred fluids, and bottles, foams, films, and containers can be made. By "blow-molding" is meant shaping by inserting the molten self supporting preform (or "parison") in a mold and injecting a gas such as air into the parison to form the shaped article. In the case of films, shaping is accomplished by extruding a hollow tube and expanding to a larger diameter while still molten by gas pressure within the tube. The film "bubble" is cooled and subsequently collapsed to a film. Clear film can be made by the latter process.

Shaping is also accomplished by extrusion blow-molding, wherein a hollow tube or parison of molten resin is extruded vertically downward until a prespecified length has been achieved. The length of the parison depends upon the size of the bottle to be produced. The tube of molten resin is cut and carried to the blow-molding equipment where it is clamped into a mold having a shape of the bottle to be produced. It is then blown with fluid, usually air, to conform to the mold shape, and then is cooled and ejected. The mold walls are usually cooled with tap water. Unmodified PET is unsuitable for these types of operations because it does not have sufficient melt strength to prevent sagging. Although melt strength varies with viscosity of PET, it is not solely a function of viscosity or of molecular weight.

The shaping operation is meant to also include drawing or stretching below the melting point of the polymer to achieve orientation.

Thin-walled articles are produced by the present invention. By "thin-walled" is meant articles of shape and/or dimensions such that they are readily conducive to orientation of the polymer by drawing. Drawing, and the resultant orientation, is entirely optional, however.

Blow-molded bottles are usually only about 20 to 30 mils thick, and blown film is generally only about 0.5 to 10 mils thick.

Conventional additives such as antioxidants, thermal stabilizers, fillers, pigments and flame retardant additives can be used in the composition of this invention provided they do not exert any adverse effect on the melt strength.

It is preferred not to have glass fiber reinforcement.

It is highly preferred that clear articles are produced.

The following examples are presented to illustrate but a few embodiments of the invention. Comparative examples are also presented.

All parts and percentages are by weight unless otherwise indicated.

EXAMPLE 1

Poly(ethylene terephthalate), 1000 gms, having an intrinsic viscosity of 0.67 dl/g and moisture content below 0.02%. and pyromellitic dianhydride, 3.0 gms. were mixed and melt blended in a 1-inch extruder at 260°–275° C. The extrudate was in the form of a clear, molten, hollow tube that was blow-molded into a clear 4 oz. bottle. There was no evidence of parison sag. The intrinsic viscosity of the walls of the bottles was 0.86 dl/g and was found to be completely amorphous by DSC measurements. The bottle mold temperature was 10° C. and the time in the mold was 30 to 40 seconds.

The parison or molten, hollow tube, exhibiting only moderate die swell and some die lip sticking, was produced at a smooth, steady rate allowing continuous production of bottles. No additional cooling was needed to achieve clear bottles other than the tap water cooled mold. The air pressure for blow molding was about 90 psig.

The bottle had properties characteristic of amorphous unoriented poly(ethylene terephthalate); tensile strength (yield/break) = 6489/4536 psi; tensile modulus = 254,918 psi; elongation (yield/break) = 3.1/281%, water vapor transmission = 6.9 gm-mil/100 in $^2$/24 hrs. at 38° C. and 90% R.H., wall thickness = 20–25 mils.

EXAMPLE 2

Example 1 was repeated except that the pyromellitic dianhydride was replaced with 7.6 g of the ethylene glycol bis(4-trimellitate anhydride) which is the ester adduct of trimellitic anhydride and ethylene glycol. Clear self-supporting parisons were formed which could be blow-molded into clear bottles.

EXAMPLE 3

Example 1 was repeated except that pyromellitic dianhydride was replaced by 9.0 gms. of 3,3',4'-benzophenonetetracarboxylic dianhydride. Clear, self-supporting parisons were formed which could be blown into clear bottles.

EXAMPLE 4

Poly(ethylene terephthalate), 100 gms. having an intrinsic viscosity of 0.67 dl/g and a moisture content below 0.02%, pyromellitic dianhydride, 5.0 gms., and ethylene bis(stearamide), 10.0 grams, were mixed and melt blended in a 1-inch extruder at 260°–275° C. The extrudate was in the form of a clear, molten, hollow tube that was blow-molded into a clear 4 oz. bottle. There was no evidence of parison sag or opacity even when the molten tube was 12 to 16 inches in length. The walls of the bottles had an intrinsic viscosity of 0.84 dl/g and were found to be completely amorphous by DSC measurements. The bottle mold temperature was about 10° C. and the dwell time in the mold was 30 to 40 seconds.

The parison or molten, hollow tube, exhibiting only moderate die swell and no die lip sticking, was produced at a smooth, steady rate, allowing continuous production of the bottles. No additional cooling was required to achieve clear bottles other than the tap-water cooled mold. The air pressure for the blow-molding operation was about 90 psig.

The bottles had properties characteristic of amorphous, unoriented poly(ethylene terephthalate); tensile strength (yield/break) = 6263/4929 psi, tensile modulus = 243,149 psi, % elongation (yield/break) = 2.9/237%, water vapor transmission = 6.5 gm-mil/100 in $^2$/24 hours at 39° C. and 90% R.H., bottle weight = 15 gms, wall thickness = 25–30 mils.

EXAMPLE 5

Example 4 was repeated except the ethylene bis(stearamide) was replaced with 5.0 gms of stearic acid. Stable molten parisons that were readily blow-molded into clear bottles, were produced at a smooth steady rate. The intrinsic viscosity of the bottle walls was about 1.1 dl/g, and there was no evidence of crystallization in the body walls by appearance or DSC measurements.

EXAMPLE 6

Example 4 was repeated except the ethylene bis(stearamide) was replaced with 10.0 gms of N,N-dibutyl stearamide. No evidence of parison sag was encountered and clear bottles were readily produced.

EXAMPLE 7

Example 4 was repeated except the pyromellitic dianhydride was replaced with the reaction product from two moles of pyromellitic dianhydride and one mole of 1,5-pentanediol. Stable, clear, molten parisons were produced that could be blow-molded into clear bottles.

EXAMPLE 8 — Comparative

For comparative purposes, unmodified poly(ethylene terephthalate) having an intrinsic viscosity of 0.67 dl/g and a moisture content of less than 0.02% was extruded under conditions similar to Example 1. The extrudate exhibited excessive sagging and formed a very thin rod rather than a hollow tube. A stable, molten parison or hollow tube could not be formed under any conditions and the intrinsic viscosity of the extrudate was 0.65 dl/g. The melt strength was not great enough to allow bottles to be blow-molded.

EXAMPLE 9 — Comparative

Example 8 was repeated except poly(ethylene terephthalate) with an intrinsic viscosity of 1.04 dl/g was employed. Excessive parison sag occurred and it was impossible to maintain a stable, molten parison long enough to allow bottles to be blow-molded.

EXAMPLE 10

This Example illustrates the manufacture of blown film in accordance with the invention.

Poly(ethylene terephthalate), 1000 gms. having an intrinsic viscosity of 0.67 deciliters/gm. and a moisture content below 0.02%, pyromellitic dianhydride, 4.0 grams, and ethylene bis(stearamide), 10.0 grams, were melt blended in a 1 inch extruder at 260°–275° C. through a vertical film blowing die with a 2 inch diameter and a 30 mil die land into a 5 ft. bubble tower. A stable film bubble was made by introducing air into the interior of the extruded tube. The melt was cooled with a circular jet of air as it emerged from the die. The extrudate had sufficient melt strength that a stable film bubble could be maintained without difficulty. The thickness of the film could be varied from 0.5 to 6.0 mils. It was completely clear and had tensile properties characteristic of unoriented, amorphous PET; tensile strength (break) = 7500 psi, tensile modulus = 350,000 psi, % elongation (break) = 2.5%.

EXAMPLE 11 — Comparative

Example 10 was repeated except the pyromellitic dianhydride and ethylene bis(stearamide) were deleted. A stable bubble could not be maintained due to low melt strength. The extrudate continually collapsed on the die or holes developed in the tube.

We claim:

1. A method for preparing thin-walled shaped articles comprising:
   (a) extruding a composition comprising PET and about 0.1 to 5% by weight of a polyanhydride selected from the group consisting of pyromellitic dianhydride, mellitic trianhydride, tetra hydrofuran dianhydride, and polyanhydride containing at least two unsubstituted or substituted phthalic anhydride radicals to a molten self-supporting preform wherein said polyanhydride causes increased melt strength;
   (b) shaping said molten composition into a final non-crystalline form;
   (c) allowing said composition to cool to a shaped article.

2. Non-crystalline, thin-walled articles prepared in accordance with claim 1.

3. A method in accordance with claim 1 wherein the molten composition is shaped by injecting a fluid.

4. A method in accordance with claim 3 wherein the molten composition is shaped in the form of a hollow bubble which is subsequently collapsed to a film.

5. Clear amorphous blow-molded bottles prepared by the process of claim 1.

6. A method in accordance with claim 1 wherein said composition further includes a fatty acid or N-substituted fatty acid amide having at least 10 carbon atoms in the acid portion of the molecule.

7. A method in accordance with claim 6 wherein the ratio of dianhydride to fatty acid is about 0.1/1 to 10/1 by weight.

8. A method in accordance with claim 1 wherein said shaping is accomplished by blow molding.

9. Blow molded amorphous articles, blown film, or foam produced by the method of claim 8.

* * * * *